(12) United States Patent
Gieske et al.

(10) Patent No.: US 8,136,254 B2
(45) Date of Patent: Mar. 20, 2012

(54) SPLIT POWER TOOL WITH EXTENSION

(75) Inventors: Jason Gieske, Bowling Green, KY (US); Cherry A. Bochmann, Bay Village, OH (US); Erin Q. Riddell, Bay Village, OH (US)

(73) Assignee: MTD Products Inc, Valley City, OH (US)

( * ) Notice: Subject to any disclaimer, the term of this patent is extended or adjusted under 35 U.S.C. 154(b) by 898 days.

(21) Appl. No.: 12/012,788

(22) Filed: Feb. 5, 2008

(65) Prior Publication Data

US 2008/0196256 A1 Aug. 21, 2008

Related U.S. Application Data

(63) Continuation-in-part of application No. 11/756,214, filed on May 31, 2007, now abandoned.

(60) Provisional application No. 60/888,535, filed on Feb. 6, 2007.

(51) Int. Cl.
*B26D 53/12* (2006.01)
*B23D 57/02* (2006.01)
*B25G 1/04* (2006.01)
*B26B 27/00* (2006.01)

(52) U.S. Cl. ............... 30/277.4; 30/166.3; 30/296.1; 30/381; 30/517; 30/DIG. 1; 16/427; 16/429; 439/481

(58) Field of Classification Search ............. 30/296.1, 30/166.3, 210, 228, 272.1, 277.4, 340, 383, 30/517, 519, DIG. 1; 16/422, 427, 429; 220/332.2; 320/112–115; 439/481
See application file for complete search history.

(56) References Cited

U.S. PATENT DOCUMENTS

| | | | | |
|---|---|---|---|---|
| 3,757,194 | A * | 9/1973 | Weber et al. | 320/112 |
| 3,952,239 | A * | 4/1976 | Owings et al. | 320/113 |
| 3,973,179 | A * | 8/1976 | Weber et al. | 320/113 |
| 4,050,003 | A * | 9/1977 | Owings et al. | 320/113 |
| 5,802,724 | A | 9/1998 | Rickard et al. | |
| 6,181,032 | B1 * | 1/2001 | Marshall et al. | 307/150 |
| 7,152,328 | B2 | 12/2006 | Champlin | |
| 7,484,300 | B2 * | 2/2009 | King et al. | 30/296.1 |
| 7,552,806 | B2 * | 6/2009 | Tong | 191/12 R |
| 7,743,683 | B2 * | 6/2010 | Dayton et al. | 81/52 |
| 7,752,760 | B2 * | 7/2010 | Baskar et al. | 30/517 |
| 7,913,345 | B2 * | 3/2011 | Dayton et al. | 15/28 |
| 7,926,141 | B2 * | 4/2011 | Dayton et al. | 15/23 |
| 8,024,995 | B2 * | 9/2011 | Dayton et al. | 81/52 |
| 2006/0005673 | A1 | 1/2006 | Long et al. | |
| 2006/0048397 | A1 * | 3/2006 | King et al. | 30/296.1 |
| 2007/0000138 | A1 | 1/2007 | Baskar et al. | |

* cited by examiner

*Primary Examiner* — Clark F. Dexter
(74) *Attorney, Agent, or Firm* — Wegman, Hessler & Vanderburg

(57) ABSTRACT

An extendable hedge trimmer includes a housing having a handle end and a tool end. The handle end includes a battery and an electrical connector. The tool end includes a hedge trimming implement, a motor, and an electrical connector. The electrical connector of the tool end is electrically connected with the motor. Wiring is included within the handle end for electrically connecting the battery and the electrical connector of the handle end. The trimmer also includes a pole which is releasably connectable between the tool end and the handle end. The pole is configured for electrically connecting the handle end with the tool end. The trimmer also includes a latch mechanism for releasably attaching the pole between tool end and handle end. The trimmer also includes an input for receiving AC line power via a power cord, the trimmer configured for being powered by AC line power and/or battery power.

11 Claims, 16 Drawing Sheets

SPLIT POWER TOOL WITH EXTENSION

CROSS-REFERENCE TO RELATED APPLICATIONS

The present application is a continuation-in-part application and claims priority under 35 U.S.C. §120 to U.S. patent application Ser. No. 11/756,214 entitled: Split Power Tool filed May 31, 2007, now abandoned, which is a non-provisional application claiming priority under 35 U.S.C. §119 to U.S. Provisional Application Ser. No. 60/888,535 entitled: Split Power Tool filed Feb. 6, 2007. U.S. patent application Ser. Nos. 11/756,214 and 60/888,535 are hereby incorporated by reference in their entireties herein.

FIELD OF THE INVENTION

The present invention generally relates to an extendable and reconfigurable power tool, and more particularly to a power tool having two halves and an extension pole that can be inserted between the two halves to electrically connect them and make the power head end of the tool operable even though separated from the actuation end.

BACKGROUND OF THE INVENTION

Power tools are implemented for a variety of tasks, such as for pruning a hedge, cutting low-hanging branches of trees, or the like. However, currently available power tools may not have the desired adaptability or versatility for promoting ease of performance for a variety of jobs or tasks which may be required to be performed.

SUMMARY OF THE INVENTION

Accordingly, an embodiment of the present invention is directed to a power tool, including: a housing, the housing including a handle end and a tool end, the handle end and the tool end configured for being removably and directly connected together, the handle end having a battery and an electrical connector, the tool end having a motor and an electrical connector, the electrical connector of the tool end being electrically connected with the motor, the electrical connector of the tool end being electrically connected to the electrical connector of the handle end when the tool end and the handle end are removably connected together; wiring, the wiring being configured within the handle end, the wiring further configured for electrically connecting the battery and the electrical connector of the handle end; and an input for receiving AC line power via a power cord, wherein the power tool is configured for being powered by at least one of AC line power or battery power.

A further embodiment of the present invention is directed to an extendable power tool, including: a housing, the housing including a handle end and a tool end, the handle end having a battery and an electrical connector, the tool end having a motor and an electrical connector, the electrical connector of the tool end being electrically connected with the motor; wiring, the wiring being configured within the handle end, the wiring further configured for electrically connecting the battery and the electrical connector of the handle end; a pole, the pole configured for being releasably connected between said tool end and said handle end when said tool end and said handle end are separated, wherein said pole contains electrical wiring and electrical connectors, said electrical wiring and electrical connectors of the pole being configured for electrically connecting the electrical connector of the handle end with the electrical connector of the tool end; a latch mechanism, the latch mechanism being configured for releasably attaching the pole between the tool end and the handle end; and an input for receiving AC line power via a power cord, wherein the power tool is configured for being powered by at least one of AC line power or battery power.

An additional embodiment of the present invention is directed to an extendable hedge trimmer, including: a housing, the housing including a handle end and a tool end, the handle end having a battery and an electrical connector, the tool end having a hedge trimming implement, a motor and an electrical connector, the electrical connector of the tool end being electrically connected with the motor; wiring, the wiring being configured within the handle end, the wiring further configured for electrically connecting the battery and the electrical connector of the handle end; a pole, the pole configured for being releasably connected between said tool end and said handle end when said tool end and said handle end are separated, wherein said pole contains electrical wiring and electrical connectors, said electrical wiring and electrical connectors of the pole being configured for electrically connecting the electrical connector of the handle end with the electrical connector of the tool end; a latch mechanism, the latch mechanism being configured for releasably attaching the pole between the tool end and the handle end; and an input for receiving AC line power via a power cord, wherein the power tool is configured for being powered by at least one of AC line power or battery power.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
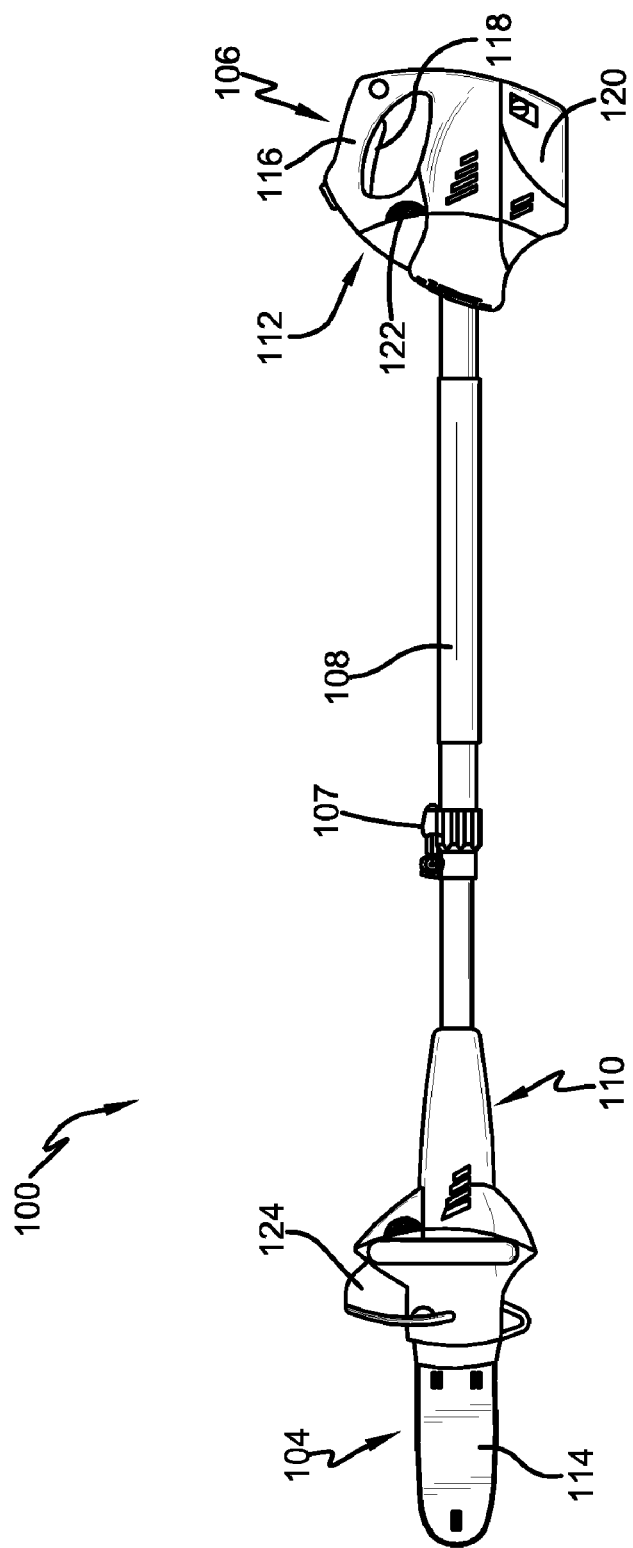
FIG. 1 is a side view of an embodiment of the extendable power tool of the present invention with a pole attachment.
Figure 1A:
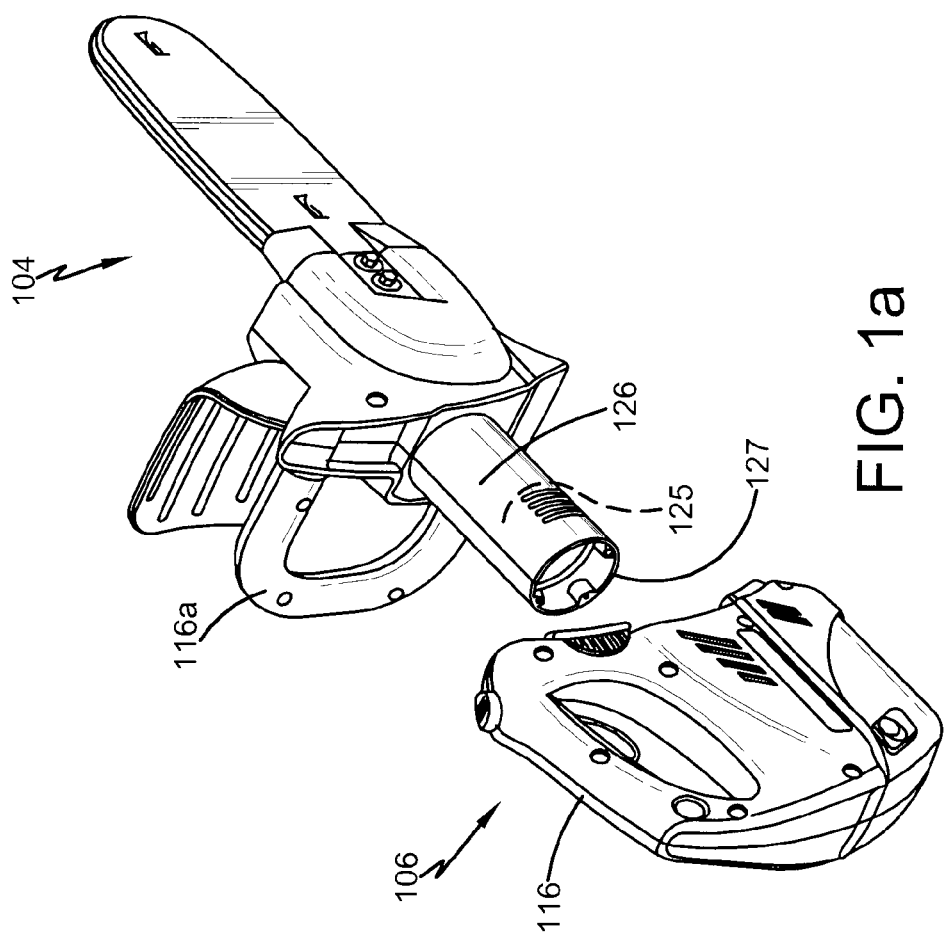
FIG. 1a is a top perspective view of an embodiment of the extendable power tool of the present invention with the handle end detached from the power head end.
Figure 14:
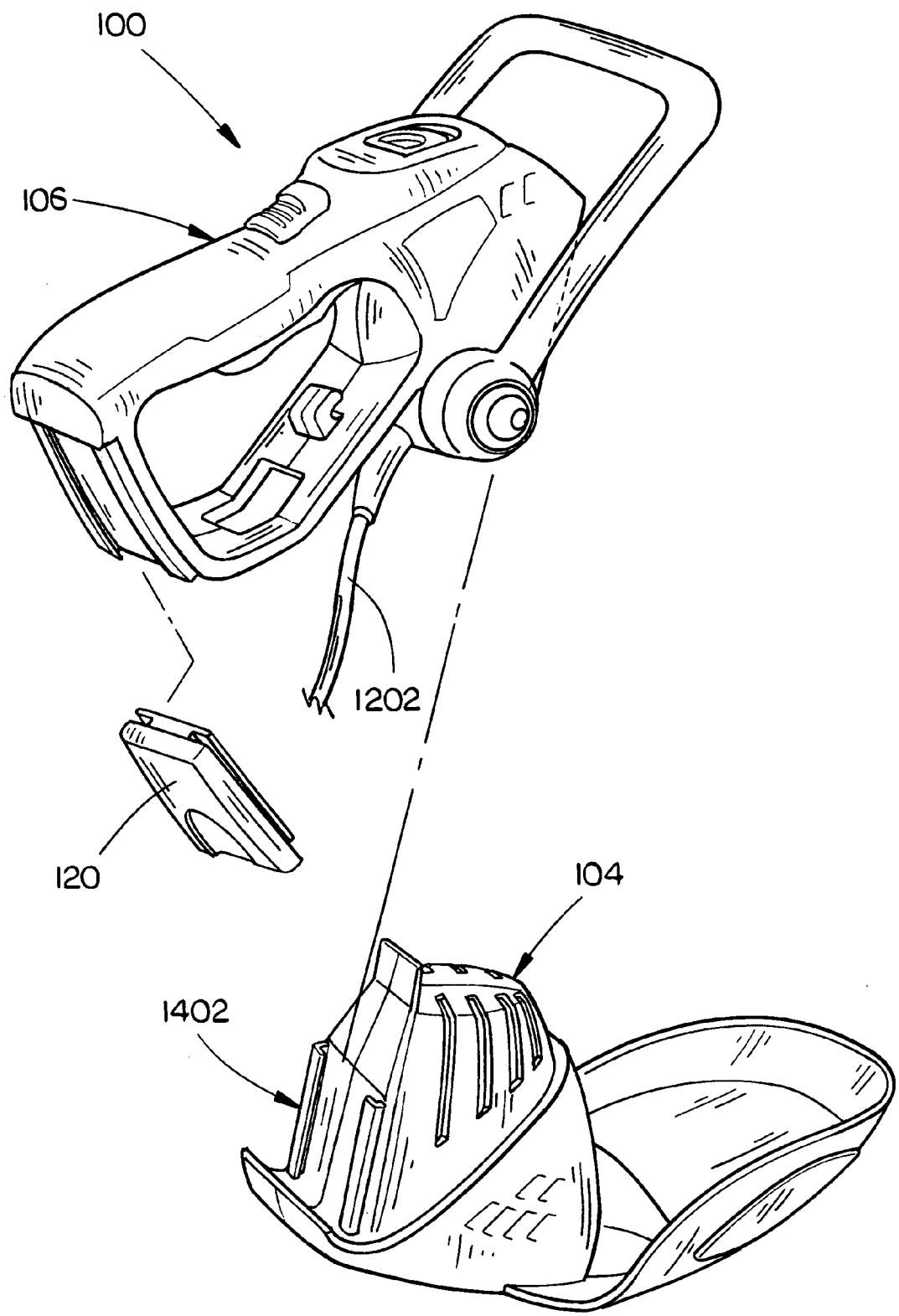
FIG. 14 is an exploded view of a hedge trimmer embodiment of the extendable power tool of the present invention without the pole attachment.

Turning now to the Figures and specifically to FIG. 1, an expandable power tool 100 includes a housing 102 having a tool or power head end 104 and a handle end 106 separated by a power tool extension device or pole 108. In one embodiment, the pole 108 is a telescoping pole whose length is adjustable. The pole 108 shown in FIGS. 1 and 7-12 has a first end 110 that mechanically and electrically attaches to the power head end 104 of the power tool and a second end 112 that attaches to the handle or actuation end 106 of the tool. In the exemplary embodiment shown in FIG. 1, the tool or power head end 104 has a saw 114 attached, but other types of tools such as hedge trimmers 114' (FIG. 12), various power heads or other gardening implements can be used. The handle end 106 has a handle 116 with a trigger 118 that is depressed in order to activate the power tool 100. In the embodiment depicted, the handle end 106 also has a battery 120, such as a NiCd 18V 1700 mah battery, which in FIG. 1 is positioned at the bottom of the handle end 106 but may be positioned in other areas. Further, the battery 120 may be removable (as shown in FIG. 14) and may also be rechargeable. In additional embodiments, (such as shown in FIG. 12), the power tool 100 may be configured for being powered by AC line power, such as by having an input for receiving AC line power via a power cord 1202. Further, the power tool 100 may have hybrid power characteristics in that it may be configured for being selectively run via AC line power, battery power or both. In the exemplary extendable power tool embodiment 100 depicted in the figures, the chainsaw has a rear handle end or rear portion 106, a hand guard 124 and a secondary handle 116a (see FIG. 1a). There are, as depicted, two main sections, the main handle section 106 and the power head section 104. These two sections 104, 106 split apart via release buttons 122 on the handle section 106 allowing the power tool or implement to be separated into a working end and a trigger or other actuation end. Typically the actuation or trigger end at the handle also contains the battery 120 in order to keep more weight to the rear section of the tool to make it more balanced and easily held during use in an extension mode. As can be seen, the extension pole 108 allows the two sections or ends to be in electrical and controlling contact but allows for the implement or power head end 104 of the tool 100 to be extended significantly beyond the handle end 106 thereby extending the reach of the tool. Various electrical contacts can be provided between handle end 106 and the implement or power head end 104 and also multiple configurations of the motor and the battery may be utilized, such as placement of either or both on the same end. Electrical or plug type contacts or connections may be utilized between the two halves with a male and female type receptacle utilized to maintain electrical connectivity between the battery, trigger and motor. Such electrically removable connection between the halves allows them to be separated readily while maintaining electrical control of the motor by the trigger. Further these same electrical contacts or plug type receptacles may be utilized in similarly positioned portions of the extension pole in order to readily allow the extension pole to be installed between the two halves of the tool. Further, wiring in the interior of the extension pole electrically connects the plugs or connectors at either end and also allows the pole to be collapsed or extended.

Figure 2:
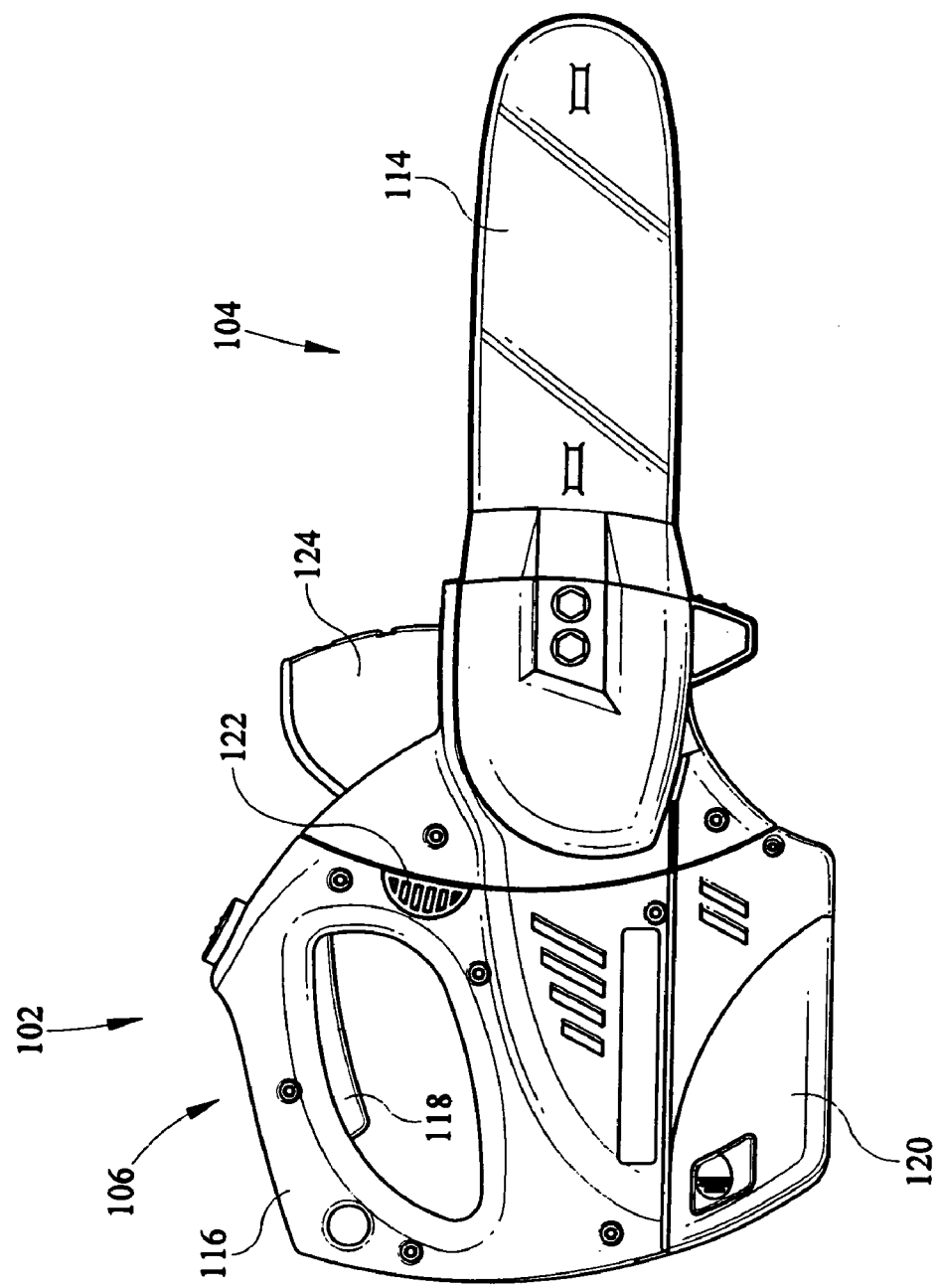
FIG. 2 is a side view of an embodiment of the extendable power tool of the present invention without the pole attachment.
Figure 3:
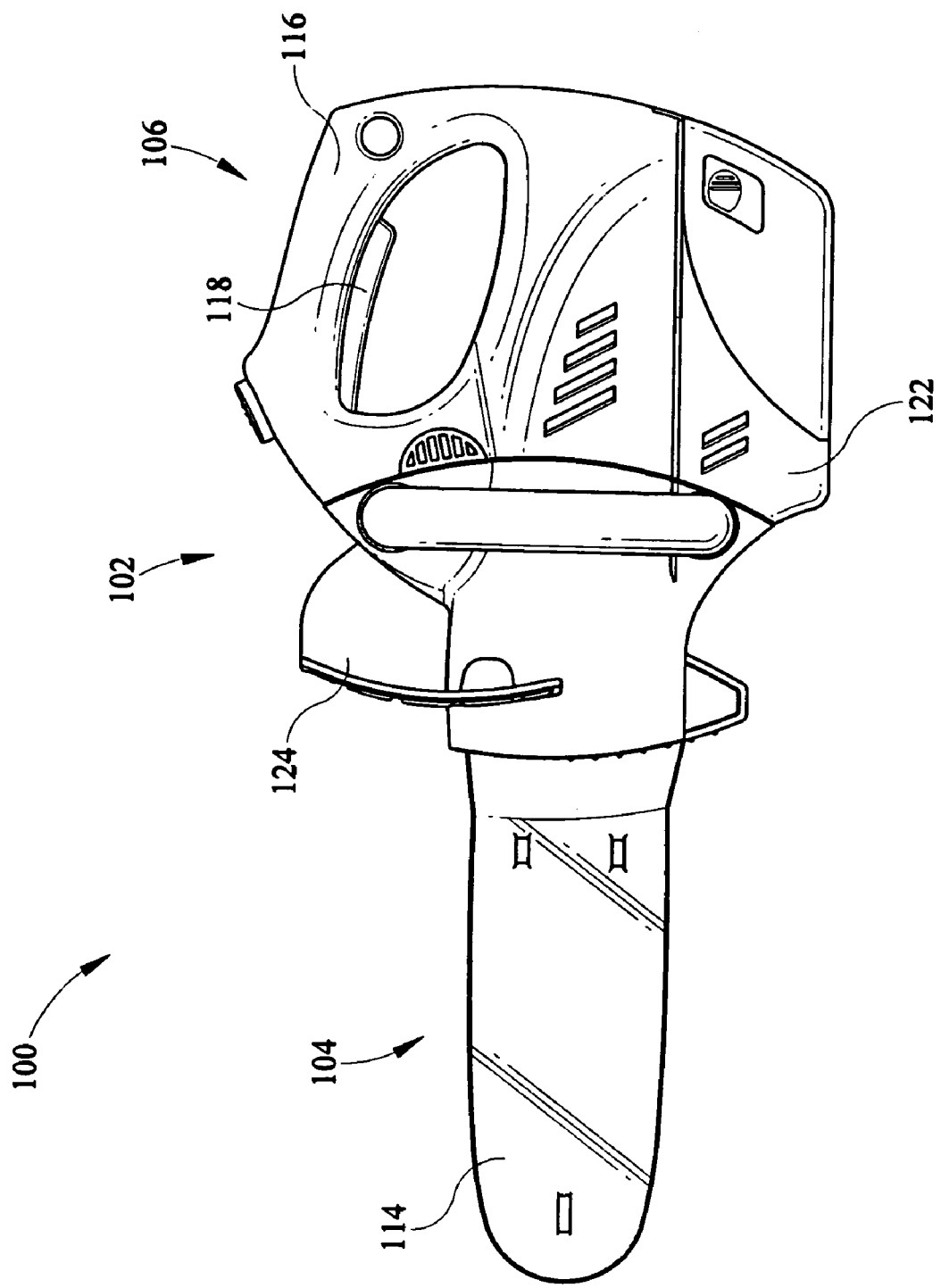
FIG. 3 is a side view of an embodiment of the extendable power tool of the present invention without the pole attachment.
Figure 4:
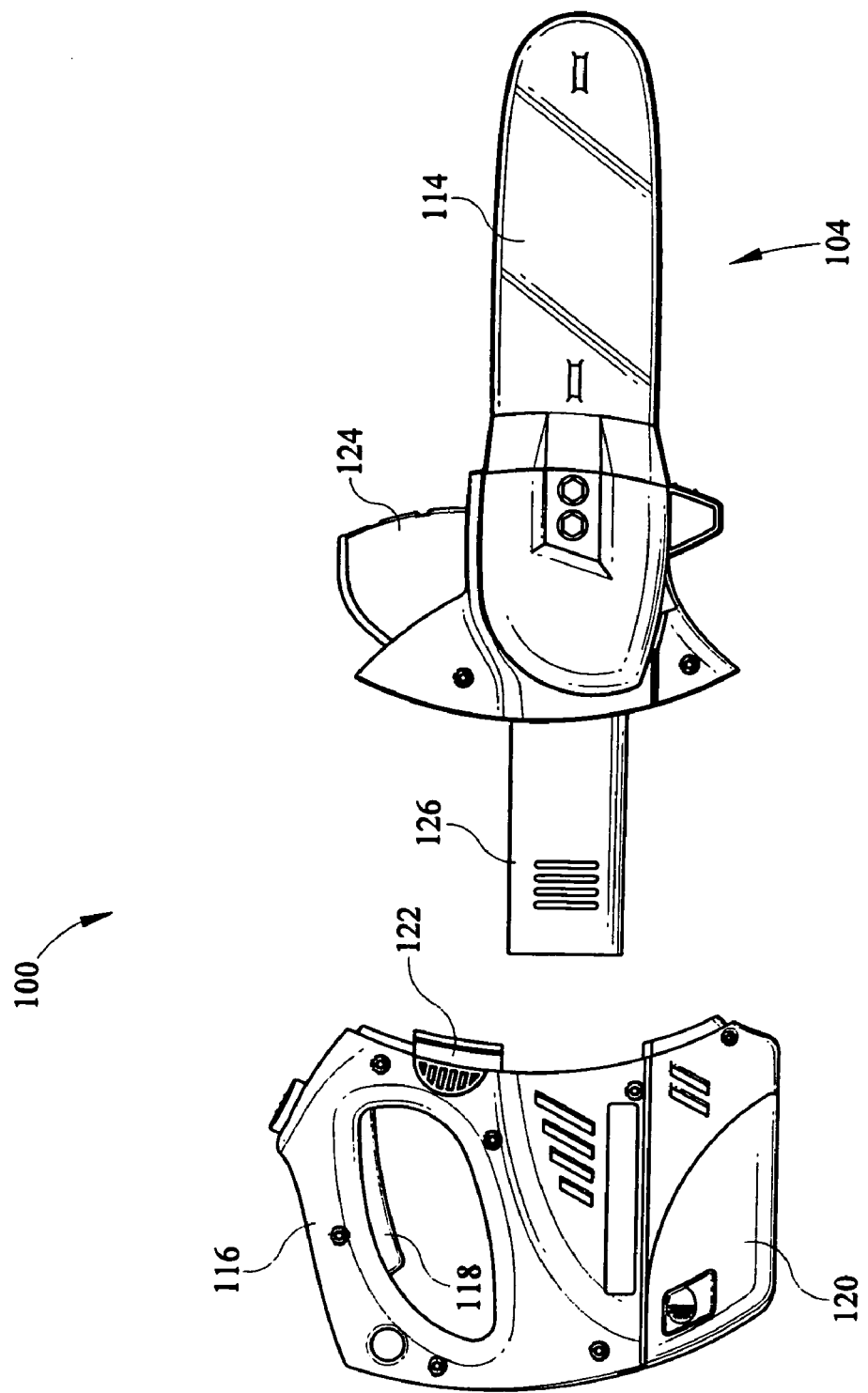
FIG. 4 is a side view of an embodiment of the power tool of the present invention without the pole attachment with the two halves separated.

FIGS. 2, 3, 13 and 14 show embodiments of the power tool 100 wherein the extension pole 108 has not been installed. In this configuration, the handle end 106 and the tool end 104 of the tool 100 are directly connected and not separated by a pole. As can be seen in FIGS. 2 and 3, the handle end 106 has a handle release button 122 on the side of the handle 116 that is adjacent the trigger 118. The handle release button 122 can be depressed in order to separate the two ends 104, 106 of the housing 102 as shown in FIG. 4 so that the pole 108 can be inserted between them. The release button 122 may be placed in alternative portions of the handle end 106 or on the power tool end 104 and may be biased in the connected or actuated position so as to maintain the two ends in mechanical as well as electrical contact. Further, as shown in FIG. 14, the tool end 104 may slidably connect to/disconnect from the handle end 106 such as via engagement of corresponding rails 1402 of both the handle end 106 and the tool end 104. Such capability promotes ease of adaptation of the power tool 100 for various types of tasks. For instance, the power tool 100 shown in FIG. 12 (the hedge trimmer embodiment w/pole), which may be best suited for trimming a top portion of a tall hedge, may have its pole 108 removed by a user, and may be quickly adapted to the power tool shown in FIG. 13 (the hedge trimmer embodiment w/o pole), which may be best suited for working in more confined areas and/or for trimming portions of the hedge which are proximal to the user.

Figure 5:
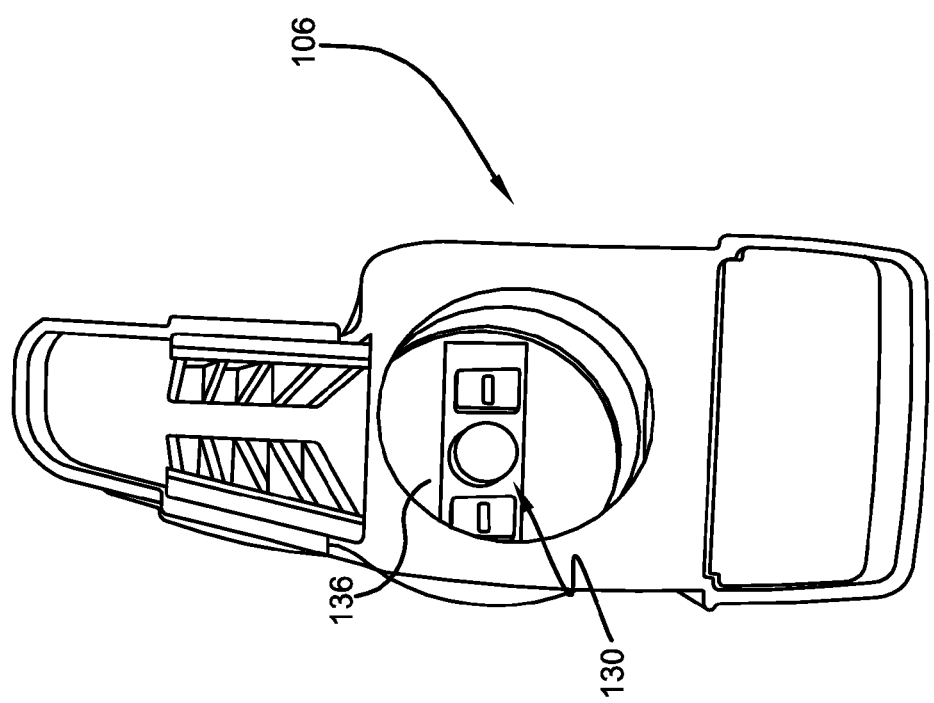
FIG. 5 is a front view of the handle end of the power tool of the present invention depicting the handle end aperture for receiving the motor.
Figure 6:
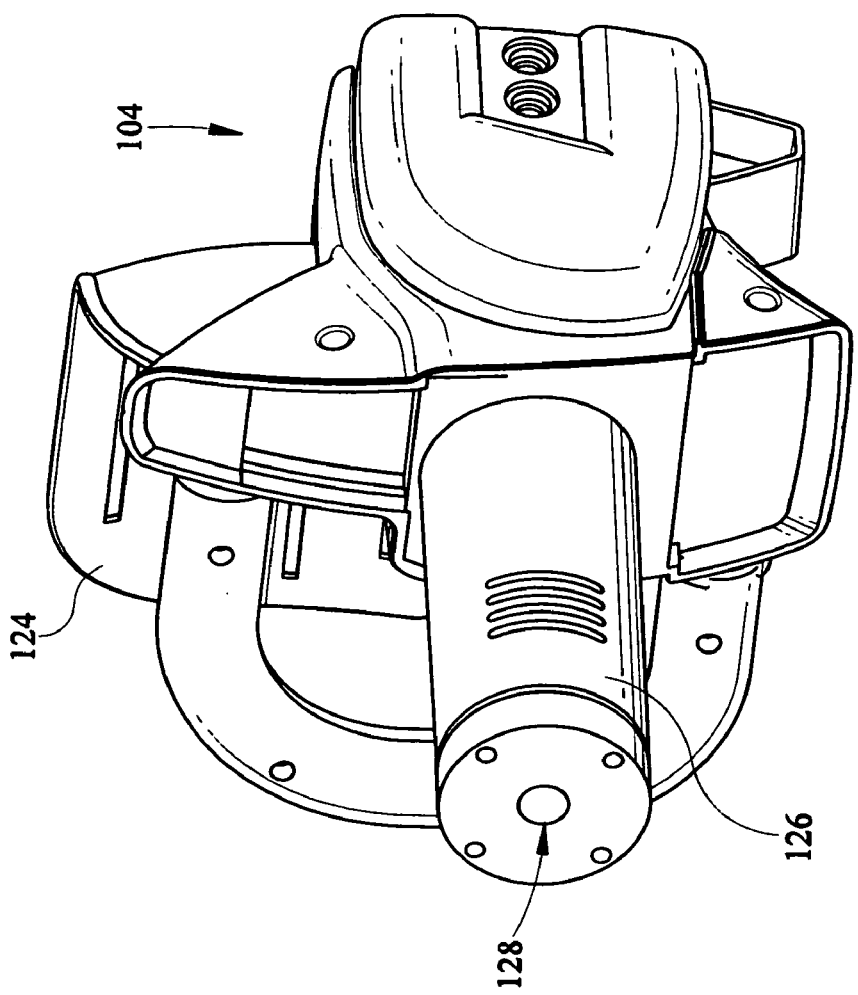
FIG. 6 is a front perspective view of an embodiment of the power head end of the power tool of the present invention.

FIG. 4 shows a side view of the power tool 100 with the two ends separated and without an extension pole 108 attached therebetween. The tool end 104 has an electric motor 125 which is located within a motor housing 126 that also acts as a mounting extension which inserts into a corresponding handle recess 136 (FIG. 5) on the handle end 106. The motor housing 126 is a generally cylindrical member extending from the tool end 104 in the direction opposite the power tool 114. The motor housing 126 has a first end 127 that is the end of the motor housing 126 located the furthest distance from the power tool 114. The motor housing 126 has a first electrical connector 128 located at the first end 127 of the motor housing 126. The first electrical connector 128, shown in FIG. 6, electrically, operatively, and controllingly connects to a second electrical connector 130 of the handle end 106, as shown in FIG. 5. The battery 120 of the handle end 106 is operatively connected to the second electrical connector 130 by way of electrical wiring (not shown), and the motor 125 of the tool end 104 is operatively connected to the first electrical connector 128 by way of electrical wiring (not shown). When the tool end 104 and the handle end 106 are attached together, the motor housing 126 of the tool end 104 is inserted into the recess 136 of the handle end 106 until the second electrical connector 130 is in electrical contact with the first electrical connector 128, and the battery 120 of the handle end 106 is operatively connect to the motor 125 within the motor housing 126 of the tool end 104. Thus, electricity flows from the battery 120 to the motor 125, which powers the saw. The electrical connectors 130 and 128 can be of any known electrical connection in order that the handle end trigger 118 can electrically control the motor and the power tool implement at the opposite end of the tool or implement. The motor 125 may be a DC electric motor which is of acceptable size and power to actuate the implement end of the power tool. As shown, the DC motor 125 may be integrated with the motor housing 126 or may be integrated directly within the housing of the implement end of the tool.

Figure 7:
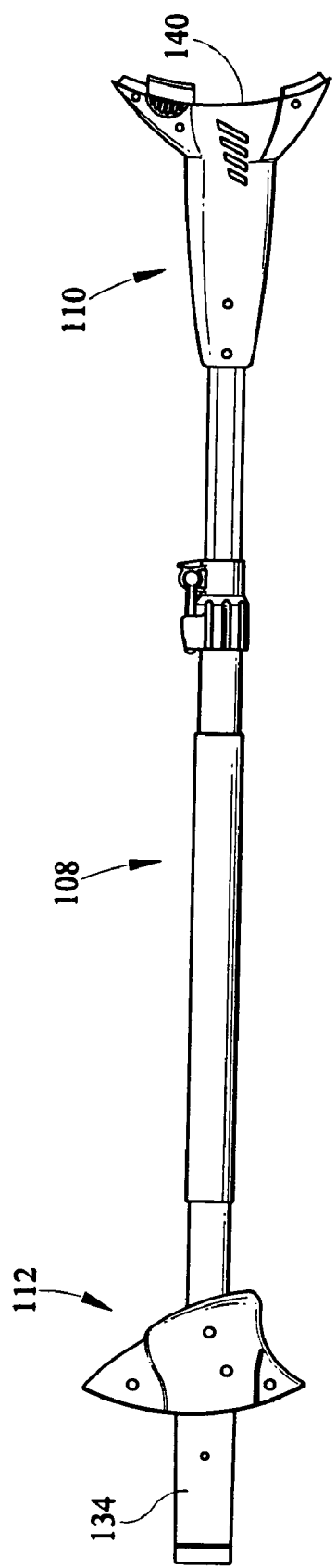
FIG. 7 is a side view of the extension pole for use with the extendable power tool of the present invention.
Figure 8:
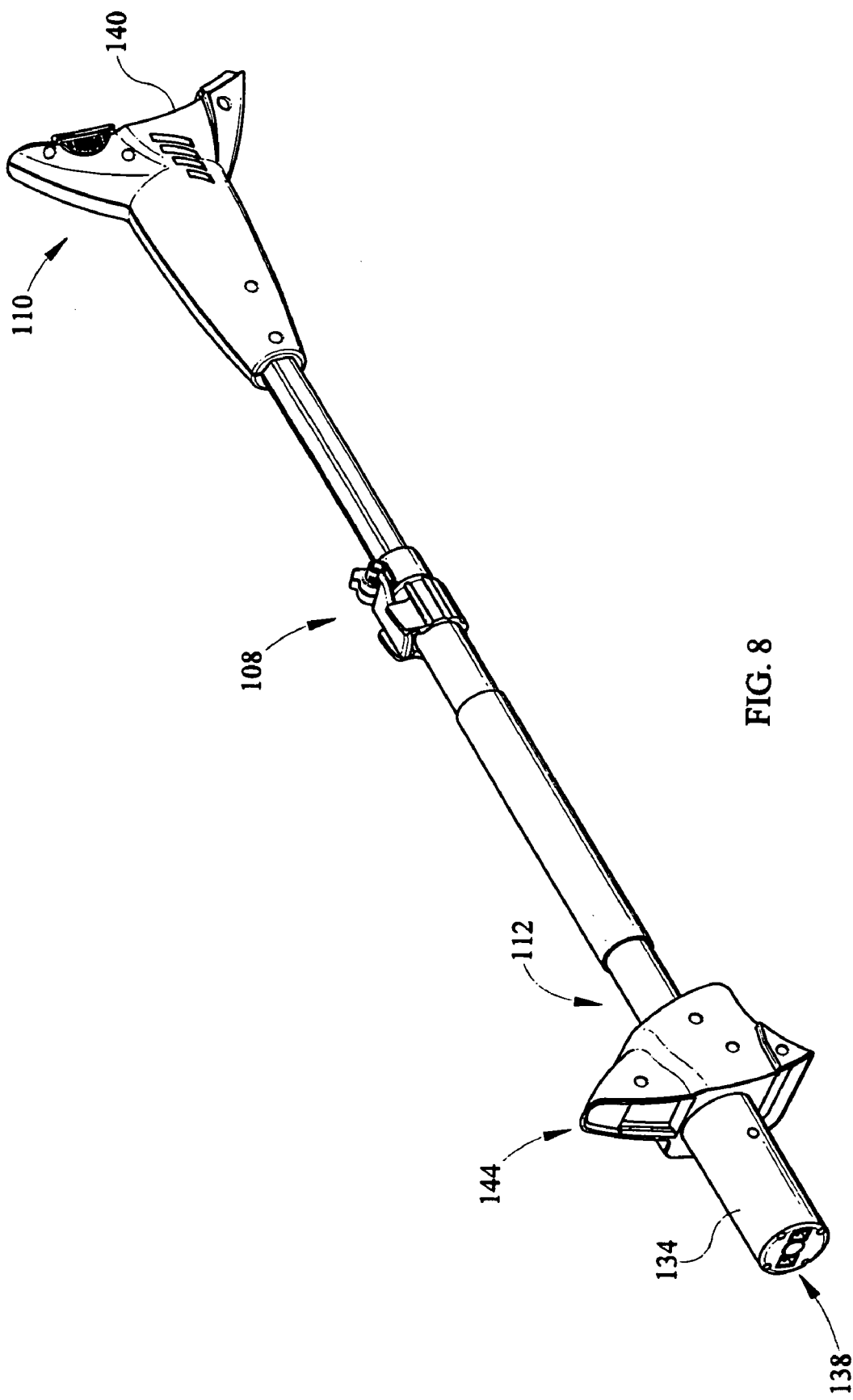
FIG. 8 is a perspective view of one embodiment of the extension pole of FIG. 7.

FIGS. 7-11 show a side view of the extension pole 108 which fits between the two separated sections of the power tool implement. The extension pole 108 has the first end 110 having a recess 140 and the second end 112 having an extension 134. As shown in FIG. 8, the extension 134 has a third connector 138 on its outer edge. The locking extension 134 of the pole 108 fits in the handle recess 136 and electrically connects to the first connector 130. At the first end 110 of the pole 108 is the pole recess 140, which has a fourth connector (not shown) therein to which the first electrical connector 128 of the motor housing 126 on the tool end 104 electrically connects in order that the electrical connection between the trigger and the power head is maintained even with the extension pole in place. The pole 108 contains wiring in its interior that electrically connects the third connector 138 to the fourth connector (not shown) and thereby connects the battery 120 to the motor 125 of the tool end 106.

Figure 9:
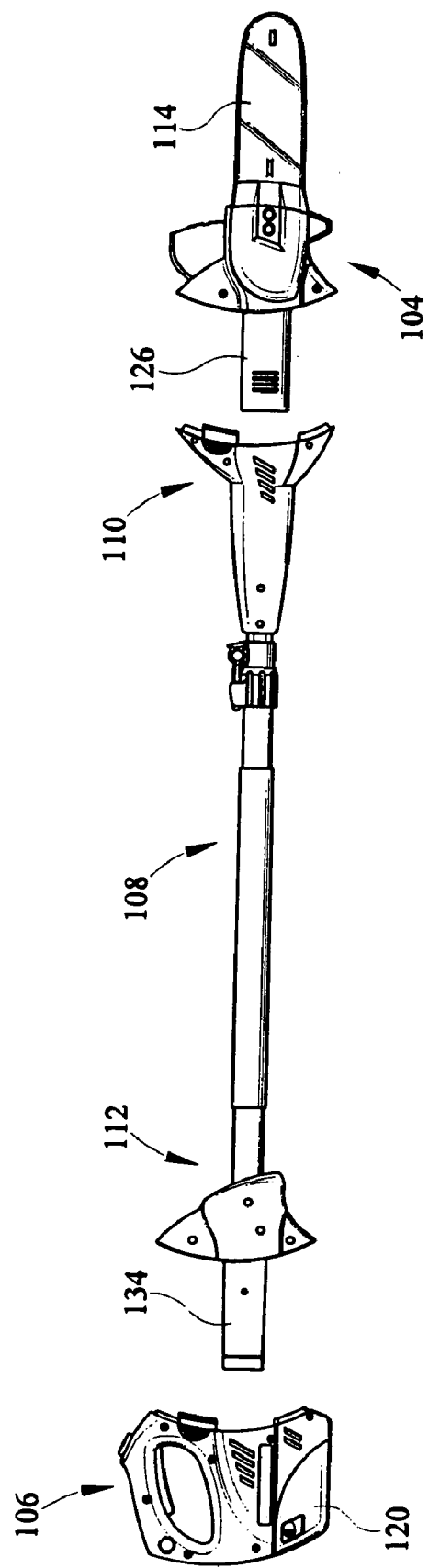
FIG. 9 is a side view of the power head, handle end and extension pole of the present invention.

A separated view of an embodiment of the power tool 100 with a pole 108 is shown in FIG. 9. The housing 102 is shown split into its tool end 104 and handle end 106 and the pole 108 positioned therebetween. As can be seen in FIG. 9, the motor 125 and motor housing 126 of the tool end 104 is similar in construction to the locking extension 134 of the pole 108 such that they both fit into the handle recess 136 Likewise, the handle recess 136 and the pole recess 140 are similar such that the motor housing 126 fits into both. In the embodiment depicted, the pole 108 may be a telescoping pole and may have an adjustable length by use of a telescoping locking ring 107 (FIG. 1) positioned thereon allowing the outer end of the extension pole to telescope into the end nearer the handle end of the tool or other implement. This configuration is depicted in the differences in length shown between FIGS. 7 and 9 wherein FIG. 7 shows a lengthened pole and FIG. 9 depicts a shortened pole with the locking ring all the way abutting the first end 110 of the pole 108.

Figure 10:
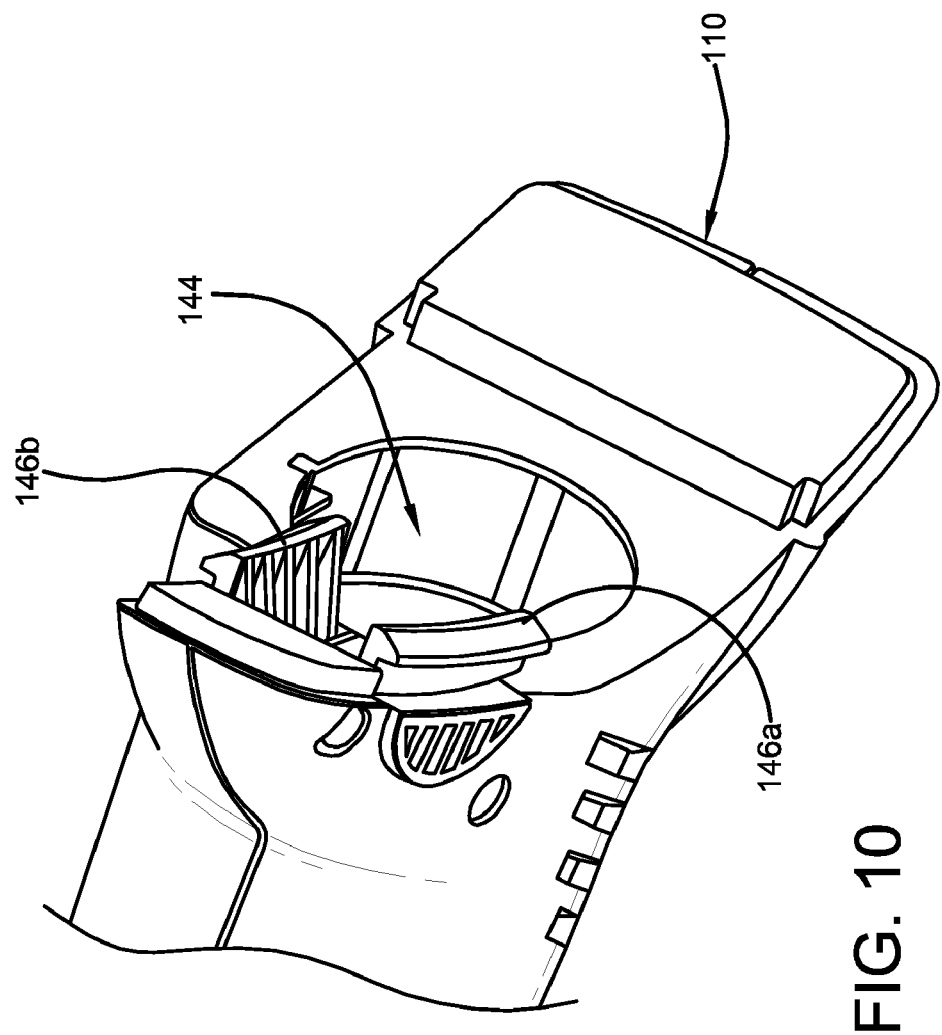
FIG. 10 is a top perspective view of the latch mechanism of the extension pole of the present invention.
Figure 11:
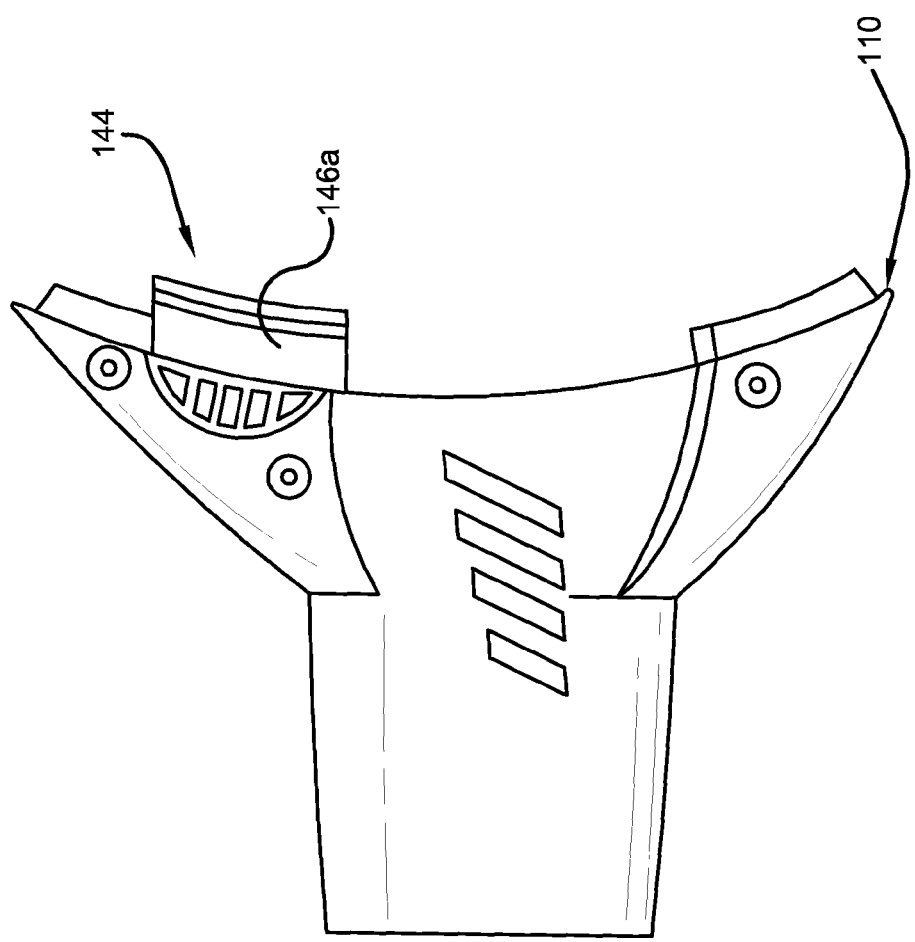
FIG. 11 is a view of an embodiment of the latch mechanism of the present invention.
Figure 12:
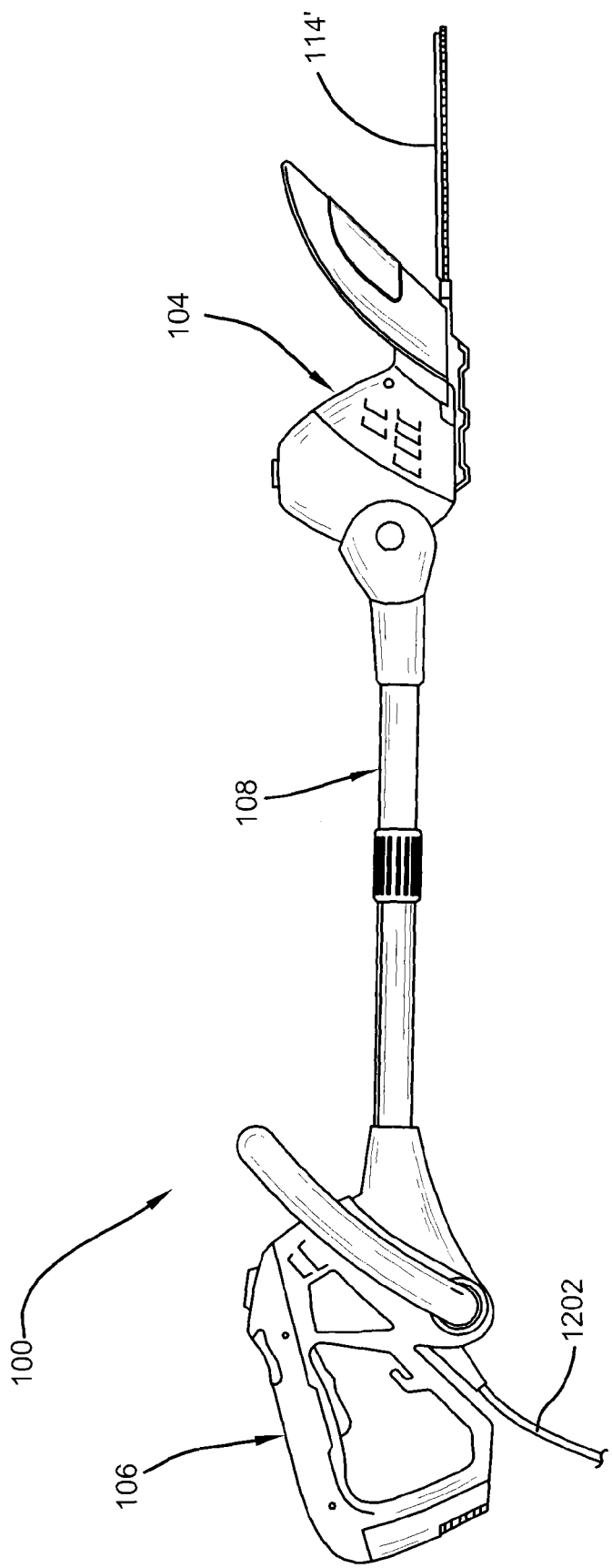
FIG. 12 is a view of a hedge trimmer embodiment of the extendable power tool of the present invention with the pole attachment.
Figure 13:
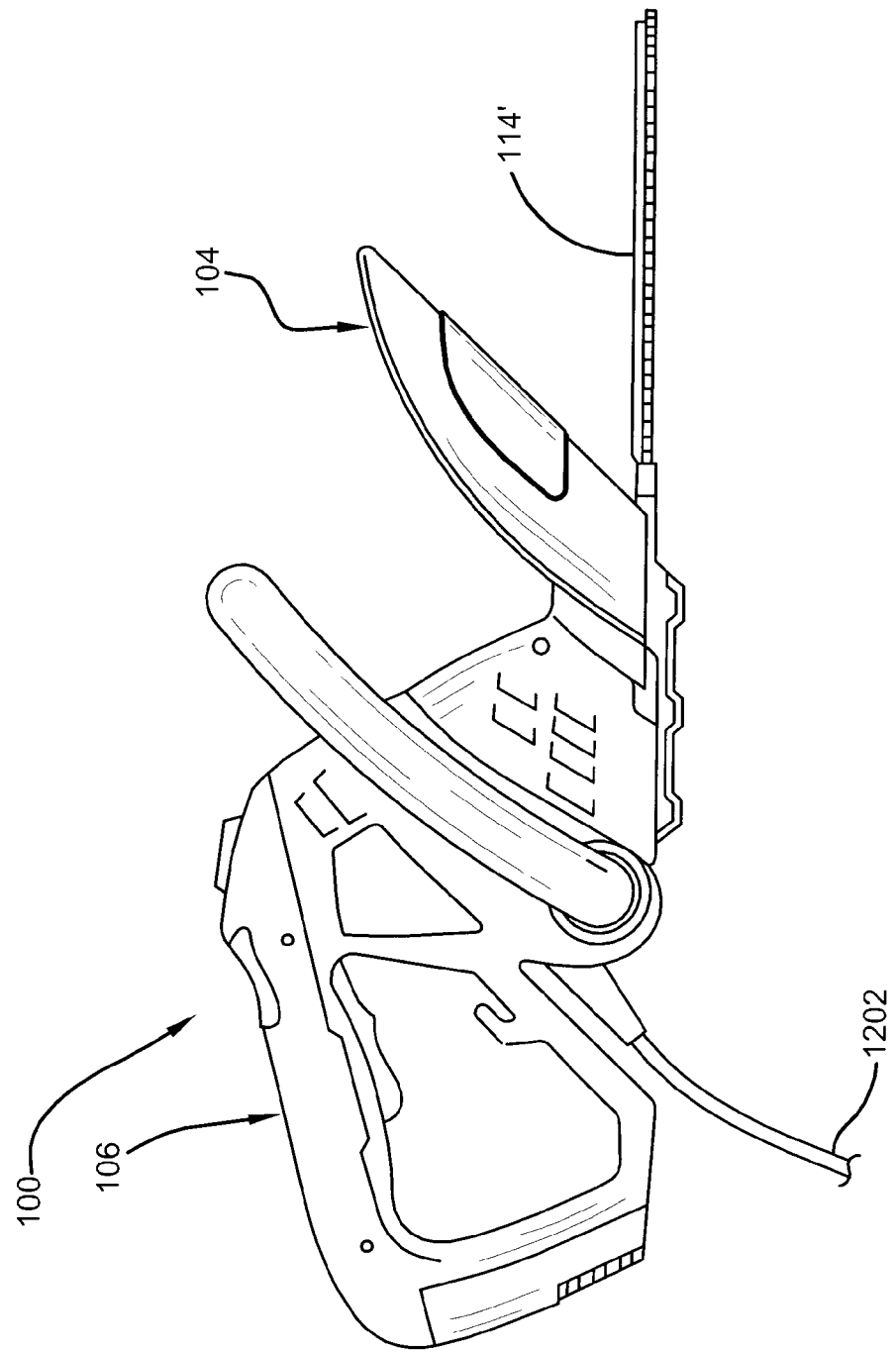
FIG. 13 is a view of a hedge trimmer embodiment of the extendable power tool of the present invention without the pole attachment, the handle end of the power tool being directly connected with the tool end.
Figure 15:
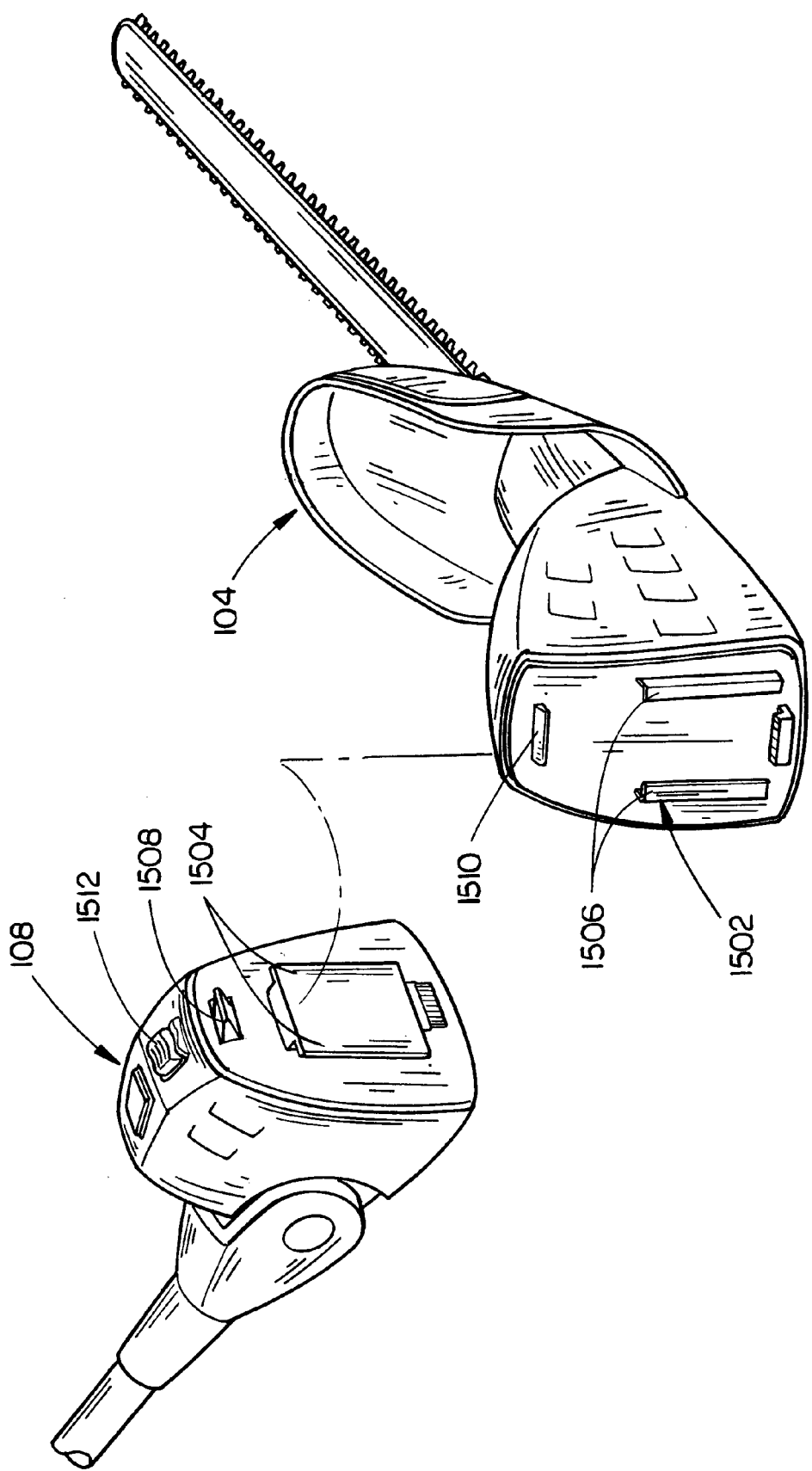
FIG. 15 is a view of an attachment mechanism for attaching the extendable power tool of the present invention to the pole attachment in accordance with an alternative exemplary embodiment of the present invention.

FIGS. 10 and 11 show the latching mechanism 144 of an embodiment of the invention. There may be two latch mechanisms 144 on the first end 110 of the extension pole, such latch mechanisms similar in construction as those provided on the housing of the power tool 100. A first biased latch (146a) and a second biased latch (146b) may be provided to clamp or latch onto clasp sections formed on the opposing surface of the handle end of the tool. A similar latch mechanism may be provided at the opposite end 112 of the extension pole 108. The latch mechanism 144 shown in FIGS. 10 and 11 has two pincers or biased latches 146a and 146b that attach to the housing 102. The latch mechanism 144 keeps the two ends 104, 106 of the housing 102 and extension pole 108 together until the handle release button 122 is pressed. Once the handle release button 122 is pressed, the tool end 104 separates from the extension pole 108 and similarly latches are provided to detach the handle end 106. In further embodiments, as shown in FIG. 15, the tool end 104 (and/or the handle end 106) may be connected to/disconnected from the pole 108 via a rail connect mechanism 1502. In the exemplary embodiment, the pole 108 is configured with a first set of rails 1504, while the tool end 104 (or handle end 106) is configured with a corresponding second set of rails 1506. The rails 1504 of the pole 108 may slidably interconnect with the rails 1506 of the tool end 104. Further, once fully engaged/interconnected, the pole 108 and the tool end 104 may remain securely connected via a snap mechanism. For instance, a spring-loaded or self-biasing tab or snap 1508 may be configured on the pole 108, and may insert or snap-fit into a corresponding slot 1510 formed in a surface of the tool end 104 when the rails 1504 of the pole 108 are fully interconnected with the rails 1506 of the tool end 104. The pole 108 may be further configured with a depressable button 1512 or switch which may be depressed in order to disengage the snap 1508 from the slot 1510, thereby allowing the rails 1504 of the pole 108 to be slidably disconnected from the rails 1506 of the tool end 104. It is contemplated by the present invention that the arrangement of the above-referenced elements may be varied, such as the snap 1508 and button 1512 being configured on the tool end 104, with the slot 1510 being configured in the pole 108.

While shown herein, the exemplary embodiment power tool may be utilized as a chain saw. However, as described, the primary components of the power tool and separable nature of the handle end and the power tool end of the tool with the ability to interconnect the two ends with an extension pole, may be utilized with many different implements and power tool features. Primarily, the design presented herein allows the trigger end and battery of the tool to be separated from the power head end and motor. Further, electrical connection may be maintained between the two ends with no extra parts as the extension pole described herein may be installed without the need for external tools and maintains electrical connection and control between the two halves through the extension pole.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A power tool, comprising:
    a housing, the housing including a handle end and a tool end, the handle end and the tool end configured for being removably and directly connected together, the handle end having a battery, a recess formed into the handle end, and a first electrical connector disposed within the recess wherein the battery is operatively connected to the electrical connector, the tool end having a motor located within a motor housing extending outwardly and a second electrical connector located at an end of the motor housing, the second electrical connector of the tool end being operatively connected with the motor, the second electrical connector of the tool end being operatively connected to the first electrical connector of the handle end when the motor housing and the motor of the tool end are inserted into the recess of the handle end;
    wherein the power tool is configured for being powered by at least one of AC line power or battery power.

2. A power tool as claimed in claim 1, further comprising:
    a pole, the pole configured for being releasably connected between said tool end and said handle end when said tool end and said handle end are separated, wherein said pole operatively and electrically connects the first electrical connector of the handle end with the second electrical connector of the tool end.

3. A power tool as claimed in claim 2, wherein said pole includes a first end and a second end, the first end of the pole forming a recess, the second end of the pole having a locking extension.

4. A power tool as claimed in claim 3, wherein said recess of the handle end is configured for releasably receiving the locking extension of the second end of the pole.

5. A power tool as claimed in claim 3, wherein the motor housing of the tool end is configured for being received by the recess of the first end of the pole.

6. A power tool as claimed in claim 3, further comprising:
a latch mechanism, the latch mechanism being configured for releasably connecting the pole between the tool end and the handle end.

7. A power tool as claimed in claim 2, wherein said pole is a telescoping pole.

8. A power tool as claimed in claim 1 wherein the motor housing is cylindrical.

9. An extendable power tool, comprising:
a housing, the housing including a handle end and a tool end, the handle end and the tool end configured for being removably and directly connected together, the handle end having a battery, a recess formed into the handle end, and a first electrical connector located within the recess wherein the battery is electrically connected to the first electrical connector, the tool end having a motor located within a motor housing extending outwardly and a second electrical connector located at an end of the motor housing, the second electrical connector of the tool end being electrically connected with the motor, wherein the motor housing and the motor of the tool end are receivable into the recess of the handle end for operatively connecting the first and second electrical connectors to one another when the handle end and the tool end are directly connected together;
a pole, the pole being releasably connected between said tool end and said handle end when said tool end and said handle end are separated, wherein said pole contains additional electrical connectors, said additional electrical connectors of the pole electrically connecting the first electrical connector of the handle end with the second electrical connector of the tool end; and
a pair of latch mechanisms, the latch mechanisms releasably attaching one end of the pole to the tool end and the an opposing end of the pole to the handle end;
wherein the power tool is configured for being powered by at least one of AC line power or battery power.

10. An extendable power tool as claimed in claim 9, wherein the pole is a telescoping pole configured for being adjusted in length.

11. An extendable power tool as claimed in claim 9 wherein the motor housing is cylindrical.

* * * * *